US012323382B2

(12) United States Patent
Shen et al.

(10) Patent No.: US 12,323,382 B2
(45) Date of Patent: *Jun. 3, 2025

(54) SYSTEMS AND METHODS FOR TRANSLATING IPV6 PACKETS FOR DIA IN AN SD-WAN ENVIRONMENT

(71) Applicant: Cisco Technology, Inc., San Jose, CA (US)

(72) Inventors: Changhong Shen, Shanghai (CN); Sampath Kumar, Santa Clara, CA (US); Ruozhong Xuan, San Ramon, CA (US); Yin Wang, Shanghai (CN); Madhu Gindi, Sunnyvale, CA (US); Garima Pal, Milpitas, CA (US); Vincent Li, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,214

(22) Filed: Dec. 26, 2023

(65) Prior Publication Data

US 2024/0137335 A1  Apr. 25, 2024

Related U.S. Application Data

(63) Continuation of application No. 17/689,051, filed on Mar. 8, 2022, now Pat. No. 11,863,515.
(Continued)

(51) Int. Cl.
*H04L 9/40* (2022.01)
*H04L 45/748* (2022.01)
(Continued)

(52) U.S. Cl.
CPC ........ *H04L 61/2514* (2013.01); *H04L 45/748* (2013.01); *H04L 63/0272* (2013.01); *H04L 2101/35* (2022.05); *H04L 2101/659* (2022.05)

(58) Field of Classification Search
CPC .............. H04L 61/2514; H04L 45/748; H04L 63/0272; H04L 2101/35; H04L 2101/659
See application file for complete search history.

(56) References Cited

U.S. PATENT DOCUMENTS 7,673,061 B2 * 3/2010 Nubani .................. H04L 69/18
370/254
8,665,873 B2 * 3/2014 Sarikaya ............... H04L 61/251
370/312
(Continued)

FOREIGN PATENT DOCUMENTS

CN        102137170 A     7/2011
WO    2016078235 A1     5/2016

*Primary Examiner* — Aftab N. Khan
(74) *Attorney, Agent, or Firm* — Baker Botts L.L.P.

(57) ABSTRACT

In one embodiment, a method includes determining, by a router, a common prefix pool from a transport interface associated with a transport virtual private network (VPN). The method also includes identifying, by the router, a prefix associated with a service VPN and generating, by the router, an IPv6-to-IPv6 Network Address Translation (NAT66) prefix translation using the common prefix pool and the prefix. The NAT66 prefix translation includes a predetermined prefix length. The method further includes automatically installing, by the router, the NAT66 prefix translation into a translation table.

20 Claims, 4 Drawing Sheets

Related U.S. Application Data

(60) Provisional application No. 63/265,248, filed on Dec. 10, 2021.

(51) Int. Cl.
*H04L 61/2514* (2022.01)
*H04L 101/35* (2022.01)
*H04L 101/659* (2022.01)

(56) References Cited

U.S. PATENT DOCUMENTS

| | | | |
|---|---|---|---|
| 8,879,394 B2 | 11/2014 | Allan et al. | |
| 9,112,764 B2 | 8/2015 | Howard | |
| 10,880,264 B1* | 12/2020 | Chakravarthy Dandangi | H04L 61/251 |
| 11,252,084 B1* | 2/2022 | Cai | H04L 43/10 |
| 2004/0141513 A1* | 7/2004 | Takechi | H04W 8/26 |
| | | | 370/471 |
| 2004/0233916 A1* | 11/2004 | Takeuchi | H04L 61/4511 |
| | | | 370/395.54 |
| 2011/0096782 A1* | 4/2011 | Park | H04L 61/2514 |
| | | | 370/392 |
| 2014/0003437 A1* | 1/2014 | Matsuhira | H04L 12/4604 |
| | | | 370/392 |
| 2014/0108624 A1* | 4/2014 | Grundemann | H04L 45/64 |
| | | | 709/220 |
| 2018/0145911 A1 | 5/2018 | Ren et al. | |
| 2019/0182155 A1* | 6/2019 | Chang | H04L 45/24 |
| 2019/0222515 A1* | 7/2019 | Pignataro | H04L 43/10 |
| 2020/0169530 A1* | 5/2020 | Saha | H04L 61/5007 |
| 2020/0204472 A1* | 6/2020 | Xue | H04L 43/10 |

* cited by examiner

SYSTEMS AND METHODS FOR TRANSLATING IPV6 PACKETS FOR DIA IN AN SD-WAN ENVIRONMENT

PRIORITY

This nonprovisional application is a continuation under 35 U.S.C. § 120 of U.S. patent application Ser. No. 17/689,051 filed on Mar. 8, 2022 and entitled "Systems and Methods for Translating IPV6 Packets for DIA in an SD-WAN Environment," which claims priority to U.S. Provisional Patent Application 63/265,248 filed on Dec. 10, 2021 both of which are hereby incorporated by reference in their entirety.

TECHNICAL FIELD

The present disclosure relates generally to communication networks, and more specifically to systems and methods for translating Internet Protocol Version 6 (IPv6) packets for direct internet access (DIA) in a software-defined wide area network (SD-WAN).

BACKGROUND

The development of digital technology and applications is overwhelming the branch and wide area network (WAN). As the number of branch offices increases, the number of devices accessing Internet-based applications also increases. The traditional WAN topology backhauls all Internet traffic to data centers, which may result in packet latency, packet drops, and jitter. Additionally, the network encounters increased costs associated with deployment and complex management.

DESCRIPTION OF EXAMPLE EMBODIMENTS

Overview

According to an embodiment, a router includes one or more processors and one or more computer-readable non-transitory storage media coupled to the one or more processors and including instructions that, when executed by the one or more processors, cause the router to perform operations. The operations include determining a common prefix pool from a transport interface associated with a transport virtual private network (VPN). The operations also include identifying a prefix associated with a service VPN and generating an IPv6-to-IPv6 Network Address Translation (NAT66) prefix translation using the common prefix pool and the prefix. The NAT66 prefix translation includes a predetermined prefix length. The operations further include automatically installing the NAT66 prefix translation into a translation table. In certain embodiments, the router is an SD-WAN edge router. In some embodiments, the transport interface is a NAT66 DIA interface. In certain embodiments, the operations include receiving a packet from a branch router. The packet may include the prefix associated with the service VPN. The operations may also include translating the prefix using the NAT66 prefix translation. The operations may further include supporting IPv6 Path Maximum Transmission Unit (IPv6 PMTU) Discovery natively and/or performing an inside-to-outside and an outside-to-inside translation for a payload of the packet.

In some embodiments, the operations include refreshing a predetermined session time period associated with the NAT66 prefix translation each time a packet is translated using the NAT66 prefix translation within the predetermined session time period, expiring the NAT66 prefix translation after in response to inactivity of the NAT66 prefix translation for the predetermined session time period, and/or reusing an entry for the NAT66 prefix translation after a predetermined expiration time period.

In certain embodiments, the operations include dynamically embedding an identifier of the service VPN into a header of the NAT66 prefix translation. In some embodiments, the operations include directing incoming traffic to the transport interface in accordance with a centralized data policy. In certain embodiments, the operations include assigning an IPv6 address prefix to the transport interface using an IPv6 generic prefix from an IPv6 neighbor discovery (ND) advertisement and/or performing IPv6 duplicate address detection (DAD).

According to another embodiment, a method includes determining, by a router, a common prefix pool from a transport interface associated with a transport VPN. The method also includes identifying, by the router, a prefix associated with a service VPN and generating, by the router, a NAT66 prefix translation using the common prefix pool and the prefix. The NAT66 prefix translation includes a predetermined prefix length. The method further includes automatically installing, by the router, the NAT66 prefix translation into a translation table.

According to yet another embodiment, one or more computer-readable non-transitory storage media embody instructions that, when executed by a processor, cause the processor to perform operations. The operations include determining a common prefix pool from a transport interface associated with a transport VPN. The operations also include identifying a prefix associated with a service VPN and generating a NAT66 prefix translation using the common prefix pool and the prefix. The NAT66 prefix translation includes a predetermined prefix length. The operations further include automatically installing the NAT66 prefix translation into a translation table.

Technical advantages of certain embodiments of this disclosure may include one or more of the following. NAT66 may be extended to achieve IPv6 NAT66 DIA with a flexible, scalable, and secure NAT66 prefix translation mechanism. In certain embodiments, this extension provides the capability and benefits via dynamic NAT66 prefix translation mapping overload based on a transport-side interface address pool assigned by IPv6 DHCPv6 prefix delegation or IPv6 Route Distinguisher (RD) prefix advertisement. This concept may significantly improve operational simplicity and scalability and provide more secure NAT66 DIA access.

Certain embodiments of this disclosure translate service VPN IPv6 packets to IPV DIA algorithmically without creating a state. In some embodiments, public network prefixes are shared among multiple service VPNs. In certain embodiments, devices dynamically participate in IPv6 ND to reserve public IPs for translated hosts in the IPv6 DAD process. Some embodiments of this disclosure allow Box2Box redundancy for the IPv6 DIA solution without creating translation state. In certain embodiments, IPv6 routes are distributed for hosts in the public Internet into a service VPN. Some embodiments described herein allow traffic from the service VPN to the Internet and from the Internet to the service VPN.

Certain embodiments of this disclosure allow traffic flow from either direction. Some embodiments have the ability to scale to a larger number of translations. Certain embodiments allow prefix delegation for a prefix range in the subnet of the WAN interface. Some embodiments allow RA prefix to be used with NAT. Certain embodiments allow NAT participation in IPv6 ND, thereby detecting any duplicate address assignments. In some embodiments, routing is simplified by not requiring route additions to the upstream router for private prefixes or NAT prefixes. In certain embodiments, multiple DIA routers are allowed in the WAN segment. Certain embodiments of this disclosure utilize DIA, which may reduce bandwidth consumption, latency, and/or costs on WAN links by offloading Internet traffic from the private WAN circuit. Certain embodiments improve branch office user experience by providing DIA for employees at remote site locations.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for translating IPv6 packets for DIA in an SD-WAN environment. Packets sent from a branch router to a service provider network are required to have the source address of the WAN interface. The prefix assigned to the WAN interface cannot be shared with other interfaces on the router. This disclosure allows the other interfaces to use a private address. The packets are translated when they pass through the WAN interface. A general method of translating IPv6 packets based on a prefix is described in RFC 6296 (IPv6-to-IPv6 Network Prefix Translation (NPTv6)). While RFC 6296 describes a general way to translate packets, it does not address specific problems involved in DIA in an SD-WAN environment. Certain embodiments of this disclosure describe an efficient way to translate IPv6 packets for DIA.

Figure 1:
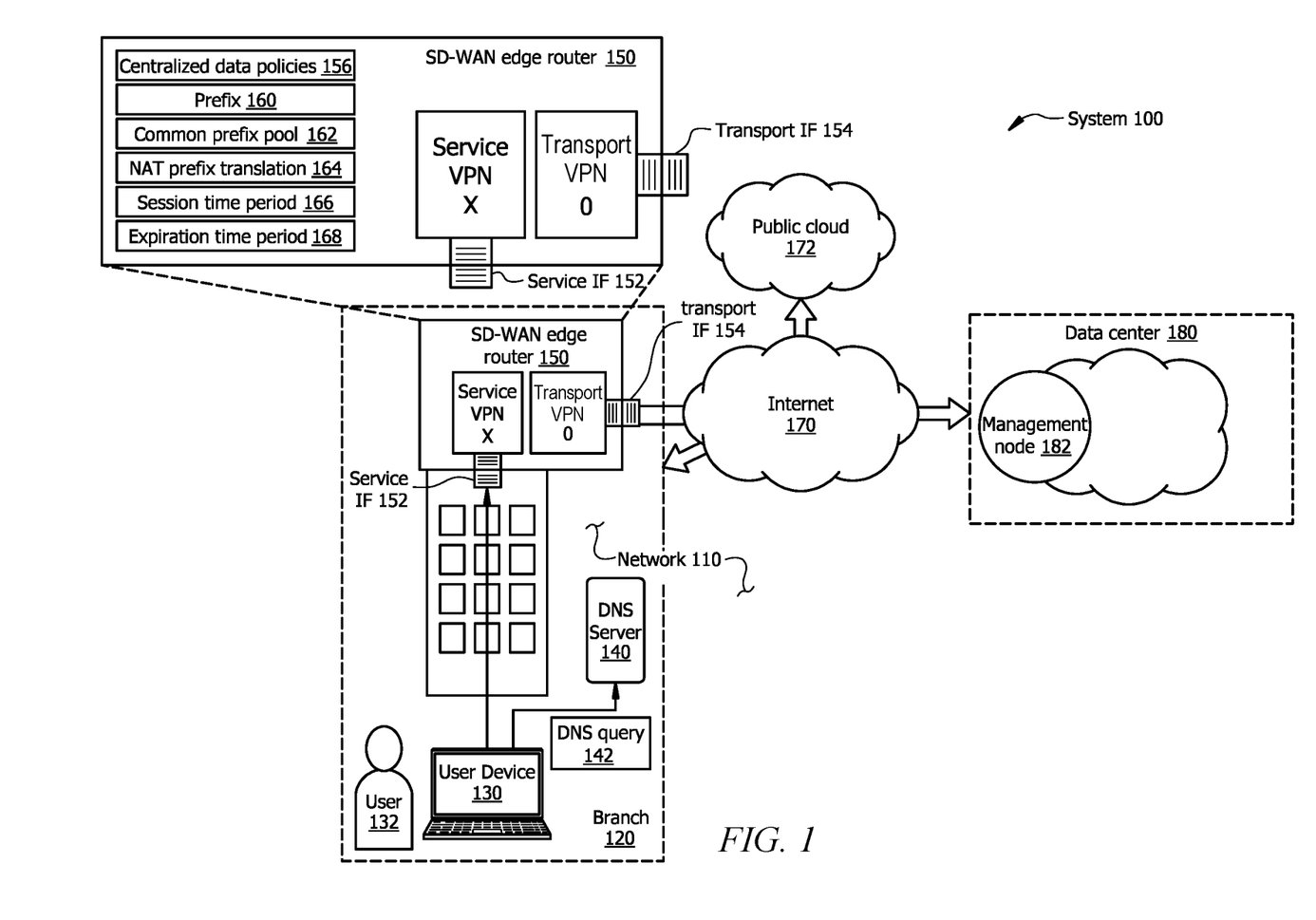
FIG. 1 illustrates an example system for translating IPv6 packets for DIA in an SD-WAN environment.

FIG. 1 illustrates an example system 100 for translating IPv6 packets for DIA in an SD-WAN environment. System 100 or portions thereof may be associated with an entity, which may include any entity, such as a business, company, or enterprise, that translates IPv6 packets in an SD-WAN environment. In certain embodiments, the entity may be a service provider that provides translation services for IPv6 packets. The components of system 100 may include any suitable combination of hardware, firmware, and software. For example, the components of system 100 may use one or more elements of the computer system of FIG. 4. In the illustrated embodiment of FIG. 1, system 100 includes a network 110, a branch 120, a user device 130, a Domain Name System (DNS) server 140, an SD-WAN edge router 150, a service interface 152, a service VPN X (where X represents any suitable integer), a transport interface 154, a transport VPN 0, centralized data policies 156, a prefix 160, a common prefix pool 162, a NAT66 prefix translation 164, a session time period 166, an expiration time period 168, an Internet 170, a public cloud 172, a data center 180, and a management node 182.

Network 110 of system 100 is any type of network that facilitates communication between components of system 100. Network 110 may connect one or more components of system 100. One or more portions of network 110 may include an ad-hoc network, the Internet, an intranet, an extranet, a VPN, an Ethernet VPN (EVPN), a local area network (LAN), a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN.

Branch 120 of system 100 is a part of an enterprise network infrastructure that provides users at a geographically disperse remote site access to the same network services as users in the enterprise campus. Branch 120 may include one or more buildings, offices, stores, homes, and the like. In the illustrated embodiment of FIG. 1, branch 120 includes user device 130, DNS server 140, and SD-WAN edge router 150.

User device 130 of system 100 includes any user equipment that can receive, create, process, store, and/or communicate information. User device 130 may include one or more workstations, desktop computers, laptop computers, mobile phones (e.g., smartphones), tablets, personal digital assistants (PDAs), wearable devices, and the like. In certain embodiments, user device 130 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 130 may be located in any suitable location to receive and communicate information to user 132 of system 100.

User 132 of system 100 is a person or group of persons who utilizes user device 130 of system 100. User 132 may be associated with one or more accounts. User 132 may be a local user, a remote user, an administrator, a customer, a company, a combination thereof, and the like. User 132 may be associated with a username, a password, a user profile, etc. In certain embodiments, user 132 initiates the communication of traffic from user device 130 to DNS server 140 and/or SD-WAN edge router 150.

DNS server 140 of system 100 is computer hardware or software (e.g., a computer program) that includes a database that maps hostnames to IP addresses through the DNS protocol. Each unique IP address may have an associated hostname. The software may maintain a cache of hostname-to-address mappings for use by the connect, telnet, and ping EXEC commands, and related Telnet support operations. In certain embodiments, DNS server 140 includes one or more name servers. Name servers are programs that have complete information about their namespace portion of the domain tree. Name servers may include pointers to other name servers that can be used to lead to information from any other part of the domain tree. In some embodiments, DNS server 140 includes one or more name resolvers. Name resolvers are programs that extract information from name servers in response to client requests. For example, DNS server 140 may extract information from a name server in response to a request received from user device 130.

SD-WAN edge router 150 of system 100 is a specialized router that resides at an edge or a boundary of the network (e.g., a LAN network) of branch 120. In certain embodiments, WAN edge router 150 uses static and/or dynamic routing to send and/or receive data to other nodes of network 110. WAN edge router 150 may include one or more hardware devices, one or more servers that include routing software, and the like. In the illustrated embodiment of FIG. 1, WAN edge router 150 resides within branch 120. In certain embodiments, the infrastructure of network 110 provides connectivity to WAN edge router 150 to access the network of branch 120, Internet 170, public cloud 172, and data center 180.

In certain embodiments, SD-WAN edge router 150 is configured to implement DIA. DIA provides branch 120 the capability to send traffic directly to Internet 170 transport instead of carrying the traffic all the way back to data center 180 to be inspected. When DIA is implemented in SD-WAN edge router 150, traffic from branch 120 that is bound for Internet 170 and/or public cloud 172 is routed directly to Internet 170.

In some embodiments, SD-WAN edge router 150 is configured to implement NAT. NAT allows private IP networks that use unregistered IP addresses to connect to Internet 170. In certain embodiments, NAT connects two networks together by translating the private addresses in the internal network of branch 120 into legal addresses before forwarding the traffic to Internet 170. For DIA, NAT translation for packets exiting from SD-WAN edge router 150 into Internet 170 may be enabled on SD-WAN edge router 150 via NAT overload. NAT overload is the mapping of multiple unregistered IP addresses to a single registered IP address by using different prefixes. To achieve this functionality on SD-WAN edge router 150, NAT is configured on transport interface 154 (e.g., NAT DIA interface), which faces Internet 170. In the illustrated embodiment of FIG. 1, transport interface 154 is associated with VPN 0. VPN 0 includes transport (or underlay) network-facing interfaces, such as Internet 170 and MPLS. Service VPN X (e.g., service VPN 1, service VPN 2, etc.) is associated with service interface 152, which is a user-facing interface of SD-WAN edge router 150.

In certain embodiments, the NAT operation on outgoing traffic is performed in VPN 0. The connection of SD-WAN edge router 150 to Internet 170 is in VPN 0. For DIA, NAT overload may be configured on transport interface 154 connecting to the Internet Service Provider's network. The source IP address of internal traffic destined for Internet 170 is translated to the IP address of transport interface 154 and exits directly to Internet 170. The rest of the traffic remains within the overlay network and travels between two nodes on secure IPsec tunnels.

In some embodiments, data policies influence the flow of data traffic through network 110 based on fields in the IP packet headers and VPN membership. Centralized data policies 156 may be used in configuring application firewalls, service chaining, traffic engineering, Quality of Service (QOS), and Cflowd. Some centralized data policies 156 (e.g., app-router policies or a QoS classification policy) may affect handling on SD-WAN edge router 150. Data traffic may be routed to a specific DIA interface of SD-WAN edge router 150 by setting a path preference using traffic data policies within centralized data policies 156. While configuring a NAT DIA route, direct local Internet traffic may be configured to exit directly to Internet 170 from service VPN X (e.g., a VPN other than VPN 0 and VPN 512) through the next hop transport VPN 0.

In certain embodiments, traffic from user device 130 is routed to VPN 0 (e.g., a NAT-enabled WAN transport VPN) from service VPN X based on the destination prefix in the NAT DIA route. The source IP address of the packet may be translated to the IP address of transport interface 154 using NAT and forwarded to the destination prefix. In this scenario, traffic flowing from branch 120 (e.g., the LAN side) is not filtered, but sent directly to the interface IP address that has been translated using NAT.

Internet 170 of system 100 is a global system of interconnected computer networks that uses the Internet protocol suite (Transmission Control Protocol/Internet Protocol (TCP/IP)) to communicate between networks and devices. In certain embodiments, users 132 of branch 120 are allowed direct access to Internet 170 for cloud-based applications, user web access, and the like. Public cloud 172 of system 100 is a combination of hardware, software, and supporting infrastructure that is owned and managed by a service provider. Cloud services offered via public cloud 172 are delivered exclusively over Internet 170. Public cloud 172 may include Google Cloud Platform (GCP), Amazon Elastic Compute Cloud (EC2), Microsoft Azure, IBM's Blue Cloud, Sun Cloud, and/or the like.

Data center 180 of system 100 is a physical facility that organizations use to house their critical applications and data. Data center 180 may include routers, switches, firewalls, storage systems, servers, application-delivery controllers, and the like. These components of data center 180 may store and/or manage business-critical data, applications, and the like. Data center 180 may be an enterprise data center, a managed services data center, a colocation data center, a cloud data center, a combination thereof, or any other suitable type of data center. In the illustrated embodiment of FIG. 1, data center 180 includes management node 182.

Management node 182 of system 100 is a centralized network management system that allows a user to configure and/or manage the entire overlay network from a graphical dashboard. In certain embodiments, management node 182 includes a dashboard (e.g., a graphical dashboard). The dashboard of management node 182 may provide a visual window into network 110 that allows a user to configure and/or manage the edge nodes (e.g., SD-WAN edge router 150). In certain embodiments, management node 182 is software that runs on one or more servers of network 110. This server may be situated in a centralized location. For example, as illustrated in FIG. 1, this server may be situated in data center 180. In certain embodiments, the software of management node 182 may run on the same physical server as the software of one or more controllers.

In certain embodiments, to access management node 182 of system 100, user device 130 (having an IPv6 address utilizes VPN 0 of SD-WAN edge router 150 by using the subdomain of the tenant Uniform Resource Locator (URL) of management node 182. For example, user 132 may request a DNS query 142 from DNS server 140 to resolve the IPv6 address of management node 182. User 132 communicates the IPv6 packet to SD-WAN edge router 150, and SD-WAN edge router 150 redirects the IPv6 packet received from user device 132 via service VPN X to transport VPN 0. VPN 0 on SD-WAN edge router 150 performs NAT66 translation. In some embodiments, the Source IP (SRC-IP)

needs to be in the IPv6 prefix range delegated by IPv6 WAN. When the traffic returns from management node 182, SD-WAN edge router 150 performs a look-up of the NAT entry and forwards the traffic to the IPv6 address of user device 130.

In certain embodiments, NPTv6 is enabled and NAT66 DIA is disabled on transport interface 154 of SD-WAN edge router 150. However, there are few challenges with this solution. NPTv6 is static and involves a manual assignment of inside and outside prefix mapping with the same prefix length, which is a significant effort as the IPv6 address is diverse and is has a length of 128 bits. Also, the IPv6 address of transport interface 154 may change with current popular address assignment approaches like IPv6 Dynamic Host Configuration Protocol (DHCP) prefix delegation and/or IPv6 Router Advertisement (RA) Stateless Address Auto-configuration (SLAAC) autoconfiguration. Additionally, this solution may present a security concern as static mapping may allow a ping hole from direct access from the outside. Also, scalability may present an issue when multiple VPNs are involved. Additionally, IPv6 routing may become complex when the outside prefix pool is selected.

Certain embodiments of this disclosure propose a different approach to achieve NAT66 DIA with a flexible, scalable, and secure NPT66 prefix translation mechanism. In some embodiments, the workflow of the prefix translation overload mechanism for NAT66 DIA use case is combined with static NAT44 and session stateful overload NAT translations. The embodiments of this disclosure may overcome the current challenges while keeping IPv6 prefix level translation simple and flexible. In certain embodiments, security and scalability are improved for the overall feature functionality.

In certain embodiments, SD-WAN edge router 150 of system 100 generates NAT66 prefix mapping dynamically based on inside-to-outside traffic hitting NAT DIA routes or centralized data policies 156 with NAT66 DIA. The IPv6 address prefix assigned for transport interface 154 may be either from IPv6 DHCP prefix delegation or IPv6 RA Prefix update from an upstream router. In certain embodiments, the prefix translation granularity is pre-defined based on customer requirements. In some embodiments, the prefix translation granularity is determined dynamically based on prefix pool length availability.

In certain embodiments, in an IPv6 address configuration, SD-WAN edge router 150 defines a NAT66 overload configuration. SD-WAN edge router 150 may derive common prefix pool 162 (e.g., 2001:A1:F::/64) from the IPv6 address (e.g., 2001:A1:F::F/64) of transport interface 154. Instead of defining a 1:1 prefix level translation with an inside and outside prefix, NAT66 prefix translation 164 may be generated based on IPv6 DIA traffic from service VPN X to transport VPN 0 dynamically. For example, consider host (e.g., user device 130) within prefix 160 (e.g., 2001:380:1::/80 or 2001:A14:18::/80), which may be an access Internet host from service VPN X (e.g., VPN 10 or VPN 20, respectively). NAT66 prefix translation 164 is generated and installed automatically with a predetermined prefix length (e.g., 80 bits) and session time period 166 (e.g., default session time of 30 minutes). NAT66 prefix translation 164 is generated using prefix 160 and common prefix pool 162 (e.g., "nat66 prefix inside 2001:380:1::/80 outside 2001:A1:F:0:1:180 vrf 10" or "nat66 prefix inside 2001:A14:18::/80 outside 2001:A1:F::/80 vrf 20," respectively). In certain embodiments, SD-WAN edge router 150 stores NAT66 prefix translation 164 in a lookup table.

In certain embodiments, the entry by SD-WAN edge router 150 of NAT66 prefix translation 164 will hold, and the session may be refreshed. For example, if the incoming packet from user device 130 hits for existing NAT66 prefix translation 164, SD-WAN edge router 150 refreshes and extends session time period 166 (e.g., 30 minutes) unless the session is idle/inactive for session time period 166 (e.g., 30 minutes continuously). SD-WAN edge router 150 may reuse any outside prefix pool that has expired after another idle/inactive cycle of predetermined expiration time period 168 (e.g., 60 minutes).

In certain embodiments, with a pre-defined prefix length (e.g., 80 bits) and common prefix pool 162 of a predetermined mask length (e.g., 64 bits), NAT66 prefix translations (e.g., 16 bits or integers between 0 and 65,535) are available that can be reused for transport interface 154. These available NAT66 prefix translations (e.g., NAT66 prefix translation 164) may be shared across VPNs based on a demand basis. At the same time, external access from outside to inside may only be allowed for NAT66 prefix translations and may be established for specific NAT66 rule access from inside to outside. This may improve the overall security of system 100 since static mapping allows uncontrolled access from the outside, which may impose a security risk.

In certain embodiments, common prefix pool 162 of NAT66 prefix translations is derived from a general prefix (e.g., prefix 160) from a DHCPv6 prefix delegation other than the IPv6 generic prefix from an IPv6 ND advertisement. In some embodiments, NAT66 prefix translations may be allocated across the service VPN instances. In this embodiment, a more generic common prefix pool 162 is associated with transport interface 154, and prefix granularity may be extended to pool range mappings defined by service interface 152 in VPN X with a predetermined prefix length (e.g., 64 bits). With the following DHCPv6 prefix delegation pool, a predetermined number of NAT66 prefix translations (e.g., 16 bits or integers between 0 and 65,535) may be used for IPv6 NAT DIA prefix translations from the server (e.g., "IPv6 local pool client-prefix-pool 2001:A1F::/48 64").

In certain embodiments, when an update to common prefix pool 162 occurs from the outside, NAT66 implemented by SD-WAN edge router 150 of system 100 destroys and regenerates NAT66 translation rules dynamically based on new common prefix pool 162. Since NAT66 prefix translations from common prefix pool 162 of transport interface 154 are reused, address duplication may occur after inside-to-outside prefix transition, and NAT66 may utilize IPv6 DAD to avoid potential conflict. IPv6 PMTU may be supported natively, and inside-to-outside and outside-to-inside translation may be performed for IPv6 Internet Control Message Protocol (ICMPv6) header and payload.

In certain embodiments, SD-WAN edge router 150 embeds an identifier of a service VPN into a header of a translation, which allows algorithmic translation for IPv6 DIA between private networks and public Internet 170. For example, SD-WAN edge router 150 may dynamically embed an identifier for service VPN X into a header of NAT66 prefix translation 164. In some embodiments, SD-WAN edge router 150 participates in IPv6 neighbor discovery if prefix 160 is used as a public network address for DIA translations. This allows traffic from service VPN X to Internet 170 and from Internet 170 to service VPN X.

In operation, SD-WAN edge router 150 of system 100 determines common prefix pool 162 from transport interface 154 of SD-WAN edge router 150 associated with transport VPN 0 and prefix 160 associated with service VPN X. SD-WAN edge router 150 generates NAT66 prefix translation 164 using common prefix pool 162 and prefix 160. SD-WAN edge router 150 installs NAT prefix translation 164 into a translation table. SD-WAN edge router 150 determines whether NAT prefix translation 164 has been used to perform any translations within predetermined session time period 166 (e.g., 30 minutes). If SD-WAN edge router 150 determines that NAT prefix translation 164 has been used within the predetermined session time period 166, SD-WAN edge router 150 refreshes predetermined session time period 166 for NAT prefix translation 164. Upon determining that that NAT prefix translation 164 has not been used within the predetermined session time period 166, SD-WAN edge router 150 expires NAT prefix translation 164 and sends the entry for NAT prefix translation 164 back to common prefix pool 162. Upon determining that NAT prefix translation 164 has been expired for predetermined expiration time period 168, SD-WAN edge router 150 may reuse the entry for NAT prefix translation 164.

Although FIG. 1 illustrates a particular number of networks 110, branches 120, user devices 130, DNS servers 140, SD-WAN edge routers 150, service interfaces 152, service VPNs X (where X represents any suitable integer), transport interfaces 154, transport VPNs 0, centralized data policies 156, prefixes 160, common prefix pools 162, NAT66 prefix translations 164, Internets 170, public clouds 172, data centers 180, and management nodes 182, this disclosure contemplates any suitable number of networks 110, branches 120, user devices 130, DNS servers 140, SD-WAN edge routers 150, service interfaces 152, service VPNs X (where X represents any suitable integer), transport interfaces 154, transport VPNs 0, centralized data policies 156, prefixes 160, common prefix pools 162, NAT66 prefix translations 164, Internets 170, public clouds 172, data centers 180, and management nodes 182.

Although FIG. 1 illustrates a particular arrangement of network 110, branch 120, user device 130, DNS server 140, SD-WAN edge router 150, service interface 152, service VPN X (where X represents any suitable integer), transport interface 154, transport VPN 0, centralized data policies 156, prefix 160, common prefix pool 162, NAT66 prefix translation 164, Internet 170, public cloud 172, data center 180, and management node 182, this disclosure contemplates any suitable arrangement of network 110, branch 120, user device 130, DNS server 140, SD-WAN edge router 150, service interface 152, service VPN X (where X represents any suitable integer), transport interface 154, transport VPN 0, centralized data policies 156, prefix 160, common prefix pool 162, NAT66 prefix translation 164, Internet 170, public cloud 172, data center 180, and management node 182.

Furthermore, although FIG. 1 describes and illustrates particular components, devices, or systems carrying out particular actions, this disclosure contemplates any suitable combination of any suitable components, devices, or systems carrying out any suitable actions.

Figure 2:
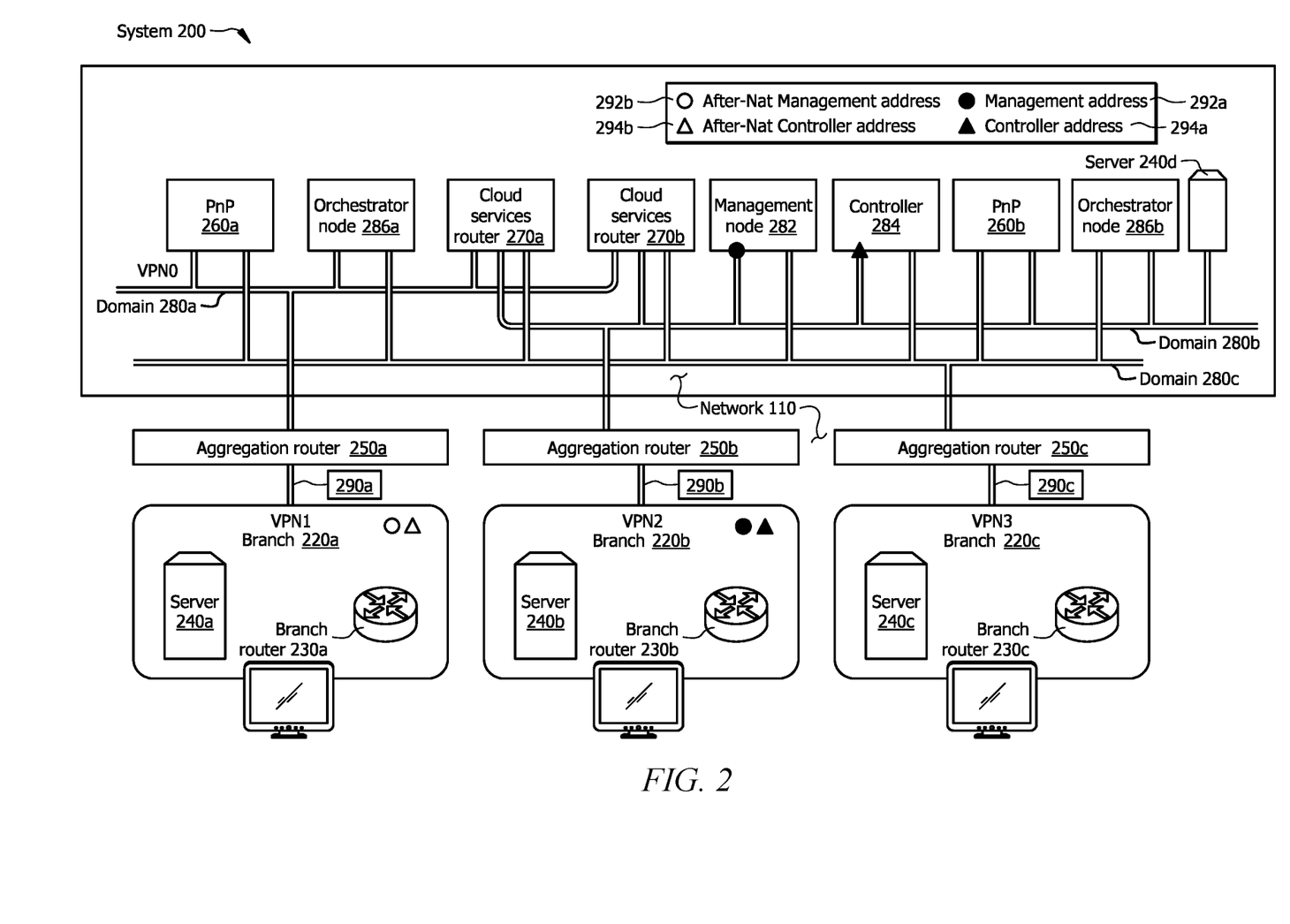
FIG. 2 illustrates another example system for translating IPv6 packets for DIA in an SD-WAN environment.

FIG. 2 illustrates another example system 200 for translating IPv6 packets for DIA in an SD-WAN environment. System 200 or portions thereof may be associated with an entity, which may include any entity, such as a business, company, or enterprise, that translates packets in an SD-WAN environment. In certain embodiments, the entity may be a service provider that provides packet translating services. The components of system 200 may include any suitable combination of hardware, firmware, and software. For example, the components of system 200 may use one or more elements of the computer system of FIG. 4.

In the illustrated embodiment of FIG. 2, system 200 includes a network 210, branches 220 (e.g., branch 220*a*, branch 220*b*, and branch 220*c*), branch routers 230 (e.g., branch router 230*a*, branch router 230*b*, and branch router 230*c*), servers 240 (e.g., server 240*a*, server 240*b*, server 240*c*, and server 240*d*), aggregation routers 250 (e.g., aggregation router 250*a*, aggregation router 250*b*, and aggregation router 250*c*), Plug and Plays (PnPs) 260 (e.g., PnP 260*a* and PnP 260*b*), cloud services routers 270 (e.g., cloud services router 270*a* and cloud services router 270*b*), domains 280 (e.g., domain 280*a* and domain 280*b*, and domain 280*c*), a management node 282, a controller 284, and orchestrator nodes 286 (e.g., orchestrator node 286*a* and orchestrator node 286*b*).

Network 210 of system 100 is similar to network 110 of FIG. 1. In the illustrated embodiment of FIG. 1, network 110 is an SD-WAN. Branches 220 (e.g., branch 220*a*, branch 220*b*, and branch 220*c*) of system 200 are similar to branch 120 of FIG. 1. In the illustrated embodiment of FIG. 2, branch 220*a* is associated with an IPv6 closed network (e.g., NTT West), branch 220*b* is associated with a different IPv6 closed network (e.g., NTT East), and branch 220*c* is associated with an IPv4 network (e.g., a mobile network).

Branch routers 230 (e.g., branch router 230*a*, branch router 230*b*, and branch router 230*c*) of system 200 are network nodes that use static and/or dynamic routing to send data to and/or receive data from one or more nodes of system 200. Branch routers 230 may include one or more hardware devices, one or more servers that include routing software, and the like. Branch router 230*a* is located in branch 220*a*, branch router 230*b* is located in branch 220*b*, and branch router 230*c* is located in branch 220*c*.

Servers 240 (e.g., server 240*a*, server 240*b*, server 240*c*, and server 240*d*) of system 200 are computer hardware or software (e.g., a computer program) that provide functionality for other programs or devices within network 210. Servers 240 may be DNS servers (e.g., DNS server 140 of FIG. 1), a DHCPv6 server, and the like. In the illustrated embodiment of FIG. 2, server 240*a* (e.g., a DHCPv6 or DNS server) is located in branch 220*a*, server 240*b* (e.g., a DHCPv6 or DNS server) is located in branch 220*b*, and server 240*c*(e.g., a DNS server) is located in branch 220*c*, and server 240*d* (e.g., a DNS server) is located in data center 180*b*.

Aggregation routers 250 (e.g., aggregation router 250*a*, aggregation router 250*b*, and aggregation router 250*c*) are similar to SD-WAN edge router 150 of FIG. 1. In the illustrated embodiment of FIG. 2, aggregation router 250*a* connects to branch 220*a* via eBGP connection 290*a* (e.g., an external Border Gateway Protocol (eBGP) connection), aggregation router 250*b* connects to branch 220*b* via eBGP connection 290*b* (e.g., an eBGP connection), and aggregation router 250*c* connects to branch 220*c* via eBGP connection 290*c* (e.g., an eBGP connection). Aggregation router 250*a* facilitates the connection between branch 220*a* and domain 280*a*, aggregation router 250*b* facilitates the connection between branch 220*b* and domain 280*b*, and aggregation router 250*c* facilitates the connection between branch 220*c* and domain 280*c*.

PnPs 260 (e.g., PnP 260*a* and PnP 260*b*) are agents that are embedded in network devices. PnPs 260 may communicate to a plug and play application using an open plug and play protocol over Hypertext Transfer Protocol Secure (HTTPS) during device deployments. In certain embodiments, PnPs 260 use DHCP, DNS, or other suitable methods in an attempt to acquire the IP address of the PnP server with which it wants to communicate. After a server is found and a connection has been established, the agent may communicate with the PnP server to perform deployment-related activities. PnP 260a is associated with domain 280a, and PnP 260b is associated with domain 280b.

Cloud services routers 270 (e.g., cloud services router 270a and cloud services router 270b) are software routers that an enterprise or a cloud provider deploys as virtual machines. In the illustrated embodiment of FIG. 2, cloud services router 270a is a virtual customer premises equipment (vCPE), and cloud services router 270b performs NAT66.

Domains 280 (e.g., domain 280a, domain 280b, and domain 280c) of system 200 are logical groupings of network nodes within the same infrastructure. In certain embodiments, domains 280 are identified using a domain name. Domains 280 that are accessible from the public Internet may be assigned a globally unique name within the DNS. Domain 280a is associated with branch 220a. Domain 280a includes PnP 260a and orchestrator node 286a, cloud services router 270a, and cloud services router 270b. In certain embodiments, domain 280a is associated with a data center. Domain 280b is associated with branch 220b. Domain 280b includes server 240d (e.g., a DNS server), PnP 260b, cloud services router 270a, cloud services router 270b, management node 282, controller 284, and orchestrator node 286b. In certain embodiments, domain 280b is associated with a data center. Cloud services router 270a and cloud services router 270b are associated with both domains 280 (e.g., domain 280a and domain 280b). Domain 280c is associated with branch 220c. Domain 280c connects to PnP 260a, PnP 260b, cloud services router 270a, and cloud services router 270b, management node 282, controller 284, orchestrator node 286a, and orchestrator node 286b.

Management node 282 of system 200 is a centralized network management system that allows a user to configure and/or manage the entire overlay network from a graphical dashboard. In certain embodiments, management node 282 includes a dashboard (e.g., a graphical dashboard). The dashboard of management node 282 may provide a visual window into network 210 that allows a user to configure and/or manage the edge nodes. In certain embodiments, management node 282 is software that runs on one or more servers of network 210. This server may be situated in a centralized location. For example, as illustrated in FIG. 2, this server may be situated in domain 280b. In certain embodiments, the software of management node 282 may run on the same physical server as the software of one or more controllers.

Controller 284 of system 200 monitors, operates, manages, troubleshoots, and/or maintains services related to network 210. Controller 284 may manage provisioning, maintenance, and/or security for network 210. In some embodiments, controller 284 is primarily involved in control plane communication and does not handle data traffic. However, controller 284 may control the flow of data traffic throughout network 210. In certain embodiments, controller 284 works with orchestrator node 286 of system 200 to authenticate the edge nodes as they join network 210 and to orchestrate connectivity among the edge nodes. In the illustrated embodiment of FIG. 2, controller 284 is located in domain 280b.

Orchestrator nodes 286 (e.g., orchestrator node 286a and orchestrator node 286b) of system 100 automatically orchestrate connectivity between the edge nodes and a controller of system 200. In certain embodiments, orchestrator nodes 286 are software that runs as processes (e.g., daemon) on one or more edge nodes. In certain embodiments, orchestrator nodes 286 have a persistent control plane connection (e.g., a Datagram Transport Layer Security (DTLS) tunnel connection) with a controller. If the controller and/or the edge node of system 200 is behind a NAT, orchestrator nodes 286 may perform the initial NAT-traversal. In the illustrated embodiment of FIG. 2, orchestrator node 286a is associated with branch 220a, and orchestrator node 286b is associated with branch 220b.

In certain embodiments, one or more network components of data centers 180 (e.g., data center 180a and data center 180b) are located in transport VPN 0. Branch router 220a is associated with a first service VPN (e.g., VPN 1), branch router 220b is associated with a second service VPN (e.g., VPN 2), and branch router 220c is associated with a third service VPN (e.g., VPN 3). Branch router 120a, branch router 120b, and branch router 120c in service VPN 1, service VPN 2, and service VPN 3, respectively, may need to reach nodes (e.g., management node 282 and/or controller 284) in transport VPN 0. Routes in VPN 0 (e.g., the Internet) are not available in the service VPNs (e.g., service VPN 1, service VPN 2, and service VPN 3), and therefore the packets cannot be routed from the service VPNs to the Internet.

To address this issue, IPv6 routes that are in VPN 0 (e.g., the Internet) are advertised in the service VPNs. The IPv6 routes may be specified using a NAT66 route command, which allows these specific routes to be re-distributed in other routing tables. For example, a management node 282 may have a management address 192a, and controller 284 may have a controller address 194a. Management node 282 may use fully qualified domain names (FQDN) for the addresses of orchestrator node 286a and orchestrator node 286b. Cloud services router 270b, which is connected to both data center 180a and data center 180b, may use NAT66 to translate management address 192a and/or controller address 194a in data center 180a (e.g., 2001:DC:A::/64) to a management address 192b and controller address 194b, respectively, in data center 180b (e.g., 2001:DC:B::/64) using 1:1 NAT. Branch router 230a uses orchestrator node 286a as its orchestrator, and branch router 230b uses orchestrator node 286b as its orchestrator. The data plane of system 200 uses cloud services router 270a (e.g., a vCPE) in data center 180a to route the traffic. As such, aggregation routers 250 (e.g., aggregation router 250a, aggregation router 250b, and aggregation router 250c) can communicate traffic from service VPN (e.g., VPN 1, VPN 2, or VPN 3) to transport VPN (e.g., VPN 0 or the Internet) and from transport VPN to service VPN.

Although FIG. 2 illustrates a particular number of networks 210, branches 220 (e.g., branch 220a, branch 220b, and branch 220c), branch routers 230 (e.g., branch router 230a, branch router 230b, and branch router 230c), servers 240 (e.g., server 240a, server 240b, server 240c, and server 240d), aggregation routers 250 (e.g., aggregation router 250a, aggregation router 250b, and aggregation router 250c), PnPs 260 (e.g., PnP 260a and PnP 260b), cloud services routers 270 (e.g., cloud services router 270a and cloud services router 270b), domains 280 (e.g., domain 280a, domain 280b, and domain 280c), management nodes 282, a controllers 284, and orchestrator nodes 286 (e.g., orchestrator node 286a and orchestrator node 286b), this disclosure contemplates any suitable number of networks 210, branches 220, branch routers 230, servers 240, aggregation routers 250, PnPs 260, cloud services routers 270, domains 280, management nodes 282, a controllers 284, and orchestrator nodes 286.

Although FIG. 2 illustrates a particular arrangement of network 210, branches 220 (e.g., branch 220a, branch 220b, and branch 220c), branch routers 230 (e.g., branch router 230a, branch router 230b, and branch router 230c), servers 240 (e.g., server 240a, server 240b, server 240c, and server 240d), aggregation routers 250 (e.g., aggregation router 250a, aggregation router 250b, and aggregation router 250c), PnPs 260 (e.g., PnP 260a and PnP 260b), cloud services routers 270 (e.g., cloud services router 270a and cloud services router 270b), domains 280 (e.g., domain 280a, domain 280b, and domain 280c), management node 282, a controller 284, and orchestrator nodes 286 (e.g., orchestrator node 286a and orchestrator node 286b), this disclosure contemplates any suitable arrangement of network 210, branches 220, branch routers 230, servers 240, aggregation routers 250, PnPs 260, cloud services routers 270, domains 280, management node 282, a controller 284, and orchestrator nodes 286.

Furthermore, although FIG. 2 describes and illustrates particular components, devices, or systems carrying out particular actions, this disclosure contemplates any suitable combination of any suitable components, devices, or systems carrying out any suitable actions.

Figure 3:
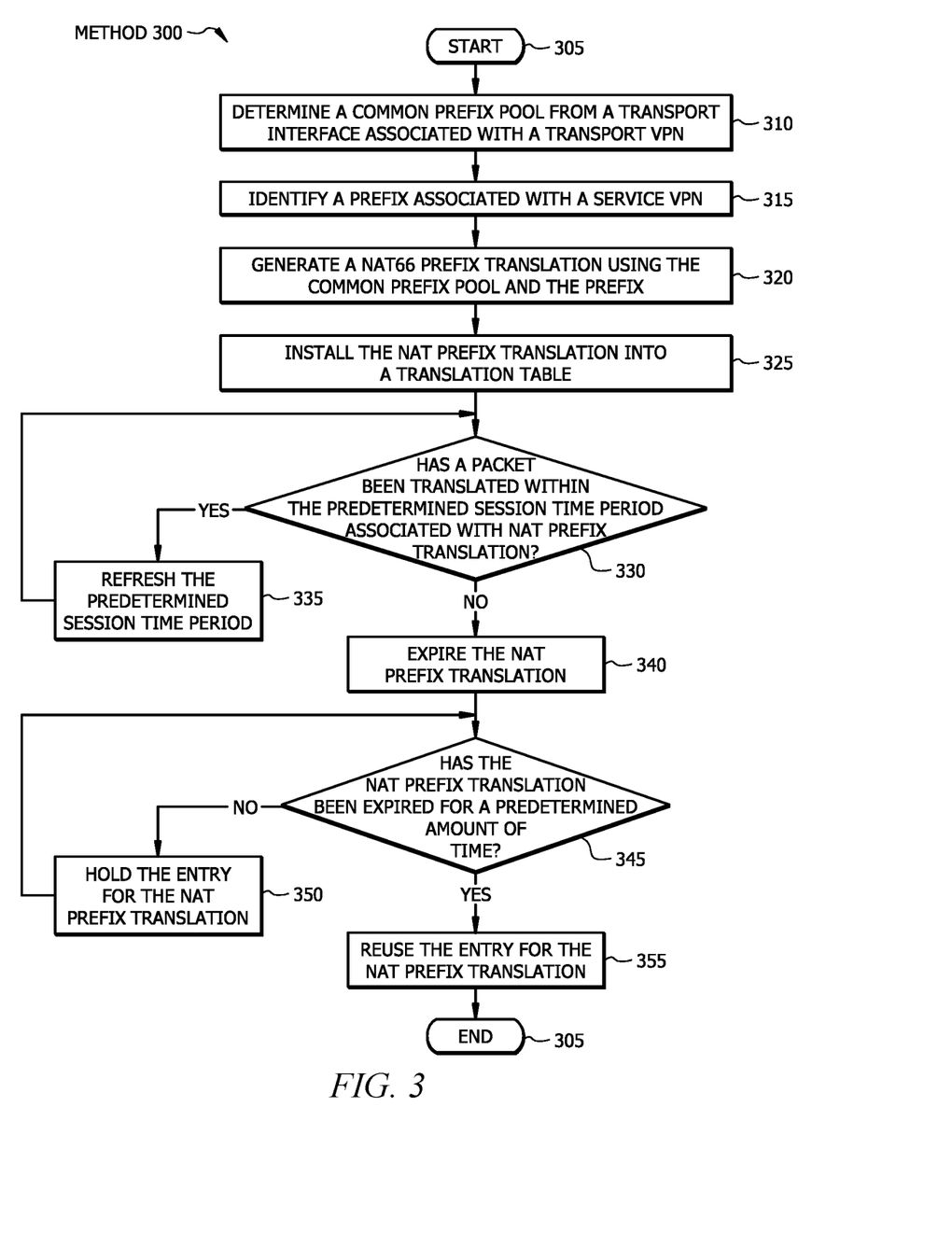
FIG. 3 illustrates an example method for translating IPv6 packets for DIA in an SD-WAN environment.

FIG. 3 illustrates an example method for translating IPv6 packets for DIA in an SD-WAN environment. Method 300 begins at step 305. At step 310 of method 300, a router determines a common prefix pool from a transport interface associated with a transport VPN. For example, referring to FIG. 1, SD-WAN edge router 150 of system 100 may determine common prefix pool 162 (e.g., 2001:A1:F::/64) using the IPv6 address (e.g., 2001:A1:F::F/64) assigned to transport interface 154 in transport VPN 0 of SD-WAN edge router 150. Method 300 then moves from step 310 to step 315, where the router identifies a prefix associated with a service VPN. For example, referring to FIG. 1, SD-WAN edge router 150 may determine prefix 160 (e.g., 2001:380:1::/80) associated with service VPN X. Method 300 then moves from step 315 to step 320.

At step 320 of method 300, the router generates a NAT66 prefix translation using the common prefix pool and the prefix. For example, referring to FIG. 1, SD-WAN edge router 150 of system 100 may generate NAT66 prefix translation 164 (e.g., nat66 prefix inside 2001:380:1::/80 outside 2001:A1:F:0:1:180 vrf 10) using prefix 160 and common prefix pool 162. Method 300 then moves from step 320 to step 325, where the router installs the NAT prefix translation into a translation table. For example, SD-WAN edge router 150 of FIG. 1 may install NAT prefix translation 164 into a translation table stored in SD-WAN edge router 150. Method 300 then moves from step 325 to step 330.

At step 330 of method 300, the router determines whether the NAT prefix translation has been used within a predetermined session time period. For example, referring to FIG. 1, SD-WAN edge router 150 of system 100 may determine whether NAT prefix translation 164 has been used to perform any translations within predetermined session time period 166 (e.g., 30 minutes). If the router determines that the NAT prefix translation has been used within the predetermined session time period, method 300 moves from step 330 to step 335, where the router refreshes the predetermined time period. For example, referring to FIG. 1, SD-WAN edge router 150 of system 100 may refresh predetermined time period 166 for NAT prefix translation 164.

Method 300 then loops back to step 330 until the router determines that the NAT prefix translation has not been used within the predetermined session time period. Upon determining that that the NAT prefix translation has not been used within the predetermined session time period, method 300 advances from step 330 to step 340, where the router expires the NAT prefix translation. For example, referring to FIG. 1, SD-WAN edge router 150 of system 100 may expire NAT prefix translation 164 and send the entry for NAT prefix translation 164 back to common prefix pool 162. Method 300 then moves from step 340 to step 345.

At step 345 of method 300, the router determines whether the NAT prefix translation has been expired for a predetermined expiration time period. For example, referring to FIG. 1, SD-WAN edge router 150 of system 100 may determine whether NAT prefix translation 164 has been expired for predetermined expiration time period 168 (e.g., 60 minutes). If the router determines that the NAT prefix translation has not been expired for the predetermined expiration time period, method 300 moves from step 345 to step 350, where the router holds the entry for the NAT prefix translation. For example, referring to FIG. 1, SD-WAN edge router 150 may hold the entry for NAT prefix translation 164 in common prefix pool 162.

Method 300 then loops back from step 350 to step 345 until the router determines that the NAT prefix translation has been expired for the predetermined expiration time period. Once the router determines that the NAT prefix translation has been expired for the predetermined expiration time period, method 300 advances from step 345 to step 355, where the router reuses the entry for the NAT prefix translation. For example, referring to FIG. 1, SD-WAN edge router 150 may reuse the entry for NAT prefix translation 164 in common prefix pool 162. Method 300 then moves from step 355 to step 360, where method 300 ends.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method for translating IPv6 packets for DIA in an SD-WAN environment including the particular steps of the method of FIG. 3, this disclosure contemplates any suitable method for translating IPv6 packets, which may include all, some, or none of the steps of the method of FIG. 3, where appropriate. Although FIG. 3 describes and illustrates particular components, devices, or systems carrying out particular actions, this disclosure contemplates any suitable combination of any suitable components, devices, or systems carrying out any suitable actions.

Figure 4:
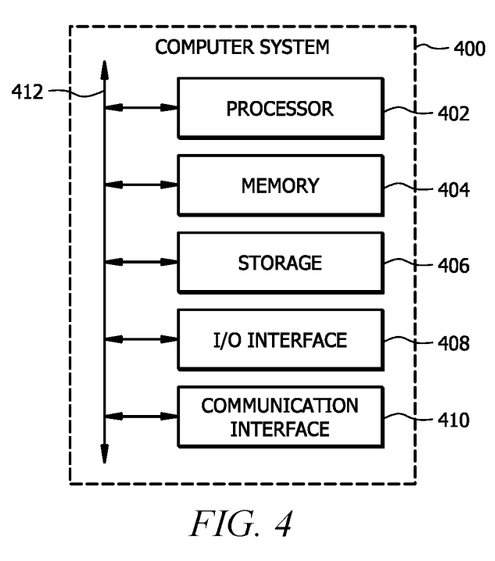
FIG. 4 illustrates an example computer system that may be used by the systems and methods described herein.

FIG. 4 illustrates an example computer system 400. In particular embodiments, one or more computer system 400 perform one or more steps of one or more methods described or illustrated herein. In particular embodiments, one or more computer system 400 provide functionality described or illustrated herein. In particular embodiments, software running on one or more computer system 400 performs one or more steps of one or more methods described or illustrated herein or provides functionality described or illustrated herein. Particular embodiments include one or more portions of one or more computer system 400. Herein, reference to a computer system may encompass a computing device, and vice versa, where appropriate. Moreover, reference to a computer system may encompass one or more computer systems, where appropriate.

This disclosure contemplates any suitable number of computer system 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer system 400; be unitary or distributed; span multiple locations; span multiple machines; span multiple data centers; or reside in a cloud, which may include one or more cloud components in one or more networks. Where appropriate, one or more computer system 400 may perform without substantial spatial or temporal limitation one or more steps of one or more methods described or illustrated herein. As an example and not by way of limitation, one or more computer system 400 may perform in real time or in batch mode one or more steps of one or more methods described or illustrated herein. One or more computer system 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or universal serial bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer system 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network element comprising one or more processors and one or more computer-readable non-transitory storage media coupled to the one or more processors and including instructions that, when executed by the one or more processors, cause the network element to perform operations comprising:
   determining a common prefix pool from a transport interface associated with a transport virtual private network (VPN);
   identifying a prefix associated with a service VPN;
   generating an IPV6-to-IPv6 Network Address Translation (NAT66) prefix translation using the common prefix pool and the prefix, wherein the NAT66 prefix translation comprises a predetermined prefix length;
   automatically installing the NAT66 prefix translation into a translation table; and
   refreshing a predetermined session time period associated with the NAT66 prefix translation each time a packet is translated using the NAT66 prefix translation within the predetermined session time period.

2. The network element of claim 1, the operations further comprising:

expiring the NAT66 prefix translation in response to inactivity of the NAT66 prefix translation for the predetermined session time period; and reusing an entry for the NAT66 prefix translation after a predetermined expiration time period.

3. The network element of claim 1, the operations further comprising:

receiving an IPV6 Internet Control Message Protocol (ICMPv6) packet from a branch router, wherein the ICMPv6 packet comprises the prefix associated with the service VPN;

translating the prefix using the NAT66 prefix translation;

supporting IPv6 Path Maximum Transmission Unit (IPV6 PMTU) Discovery natively; and performing an inside-to-outside and an outside-to-inside translation for a payload of the ICMPv6 packet.

4. The network element of claim 1, the operations further comprising dynamically embedding an identifier of the service VPN into a header of the NAT66 prefix translation.

5. The network element of claim 1, the operations further comprising directing incoming traffic to the transport interface in accordance with a centralized data policy.

6. The network element of claim 1, the operations further comprising:

assigning an IPV6 address prefix to the transport interface using an IPV6 generic prefix from an IPV6 neighbor discovery (ND) advertisement; and performing IPv6 duplicate address detection (DAD).

7. The network element of claim 1, the operations further comprising dynamically updating an address associated with the transport interface, the common prefix pool, and the translation table.

8. A method, comprising:

determining a common prefix pool from a transport interface associated with a transport virtual private network (VPN);

identifying a prefix associated with a service VPN;

generating an IPV6-to-IPV6 Network Address Translation (NAT66) prefix translation using the common prefix pool and the prefix, wherein the NAT66 prefix translation comprises a predetermined prefix length;

automatically installing the NAT66 prefix translation into a translation table; and refreshing a predetermined session time period associated with the NAT66 prefix translation each time a packet is translated using the NAT66 prefix translation within the predetermined session time period.

9. The method of claim 8, further comprising:

expiring the NAT66 prefix translation in response to inactivity of the NAT66 prefix translation for the predetermined session time period; and reusing an entry for the NAT66 prefix translation after a predetermined expiration time period.

10. The method of claim 8, further comprising:

receiving an IPV6 Internet Control Message Protocol (ICMPv6) packet from a branch router, wherein the ICMPv6 packet comprises the prefix associated with the service VPN;

translating the prefix using the NAT66 prefix translation;

supporting IPV6 Path Maximum Transmission Unit (IPV6 PMTU) Discovery natively; and performing an inside-to-outside and an outside-to-inside translation for a payload of the ICMPv6 packet.

11. The method of claim 8, further comprising dynamically embedding an identifier of the service VPN into a header of the NAT66 prefix translation.

12. The method of claim 8, further comprising directing incoming traffic to the transport interface in accordance with a centralized data policy.

13. The method of claim 8, further comprising:

assigning an IPV6 address prefix to the transport interface using an IPV6 generic prefix from an IPV6 neighbor discovery (ND) advertisement; and performing IPV6 duplicate address detection (DAD).

14. The method of claim 8, further comprising dynamically updating an address associated with the transport interface, the common prefix pool, and the translation table.

15. One or more computer-readable non-transitory storage media embodying instructions that, when executed by a processor, cause the processor to perform operations comprising:

determining a common prefix pool from a transport interface associated with a transport virtual private network (VPN);

identifying a prefix associated with a service VPN;

generating an IPV6-to-IPv6 Network Address Translation (NAT66) prefix translation using the common prefix pool and the prefix, wherein the NAT66 prefix translation comprises a predetermined prefix length;

automatically installing the NAT66 prefix translation into a translation table; and refreshing a predetermined session time period associated with the NAT66 prefix translation each time a packet is translated using the NAT66 prefix translation within the predetermined session time period.

16. The one or more computer-readable non-transitory storage media of claim 15, the operations further comprising:

expiring the NAT66 prefix translation in response to inactivity of the NAT66 prefix translation for the predetermined session time period; and reusing an entry for the NAT66 prefix translation after a predetermined expiration time period.

17. The one or more computer-readable non-transitory storage media of claim 15, the operations further comprising:

receiving an IPV6 Internet Control Message Protocol (ICMPv6) packet from a branch router, wherein the ICMPv6 packet comprises the prefix associated with the service VPN;

translating the prefix using the NAT66 prefix translation;

supporting IPv6 Path Maximum Transmission Unit (IPV6 PMTU) Discovery natively; and performing an inside-to-outside and an outside-to-inside translation for a payload of the ICMPv6 packet.

18. The one or more computer-readable non-transitory storage media of claim 15, the operations further comprising dynamically embedding an identifier of the service VPN into a header of the NAT66 prefix translation.

19. The one or more computer-readable non-transitory storage media of claim 15, the operations further comprising directing incoming traffic to the transport interface in accordance with a centralized data policy.

20. The one or more computer-readable non-transitory storage media of claim 15, the operations further comprising:

assigning an IPv6 address prefix to the transport interface using an IPV6 generic prefix from an IPV6 neighbor discovery (ND) advertisement; and performing IPv6 duplicate address detection (DAD).

* * * * *